(12) United States Patent
Schafer et al.

(10) Patent No.: US 9,686,496 B2
(45) Date of Patent: Jun. 20, 2017

(54) APPARATUS, SYSTEMS, AND METHODS FOR NOTIFICATION OF REMOTE CONTROL DEVICE MODES

(71) Applicant: EchoStar Technologies L.L.C., Englewood, CO (US)

(72) Inventors: Adam Schafer, Aurora, CO (US); Eric Hieb, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 777 days.

(21) Appl. No.: 13/722,790

(22) Filed: Dec. 20, 2012

(65) Prior Publication Data

US 2014/0176807 A1    Jun. 26, 2014

(51) Int. Cl.
| | |
|---|---|
| *G05B 11/01* | (2006.01) |
| *G08C 19/16* | (2006.01) |
| *G08C 19/12* | (2006.01) |
| *H04N 5/44* | (2011.01) |
| *H04N 21/422* | (2011.01) |
| *H04N 21/4363* | (2011.01) |
| *H04N 21/488* | (2011.01) |
| *H04N 21/436* | (2011.01) |

(52) U.S. Cl.
CPC ..... *H04N 5/4403* (2013.01); *H04N 21/42204* (2013.01); *H04N 21/4363* (2013.01); *H04N 21/4882* (2013.01); *H04N 21/43615* (2013.01)

(58) Field of Classification Search
CPC ............ G08C 2201/92; G08C 2201/20; G08C 2201/30; G08C 2201/21; G08C 2201/50; G08C 2201/51; G08C 25/02
USPC .......... 340/12.22, 12.23, 12.26, 13.24, 12.5; 341/176, 175, 173, 147; 345/169; 348/725, 734
See application file for complete search history.

(56) References Cited

U.S. PATENT DOCUMENTS

| | | | | |
|---|---|---|---|---|
| 5,416,535 | A * | 5/1995 | Sato et al. | 348/706 |
| 5,436,676 | A * | 7/1995 | Pint et al. | 348/734 |
| 5,886,753 | A * | 3/1999 | Shinyagaito et al. | 725/59 |
| 7,690,017 | B2 * | 3/2010 | Stecyk et al. | 725/80 |
| 8,031,270 | B1 * | 10/2011 | Wisniewski et al. | 348/734 |
| 8,325,022 | B2 * | 12/2012 | Lippincott | 340/13.24 |
| 8,754,992 | B1 * | 6/2014 | Schulze et al. | 348/734 |
| 2006/0287851 | A1 * | 12/2006 | Kida et al. | 704/201 |
| 2010/0123834 | A1 * | 5/2010 | Brodersen et al. | 348/734 |
| 2012/0146777 | A1 * | 6/2012 | Kim | 340/13.24 |
| 2012/0268591 | A1 * | 10/2012 | Kimura | 348/143 |

* cited by examiner

*Primary Examiner* — Emily C Terrell
(74) *Attorney, Agent, or Firm* — Seed IP Law Group LLP

(57) ABSTRACT

Apparatus, systems, and methods are disclosed for the current mode of one or more remote control devices to be displayed or played as an audio message either continuously or at various opportune times on other devices such as a presentation device (e.g., a television set). In this way, a user is able to quickly see the current mode of their remote control while watching programming on the display to determine if the remote control mode needs to be changed to control a particular device on the premises. Remote control command mode information may be communicated from the remote control in a separate remote control message or within remote control commands generated by the remote control.

2 Claims, 8 Drawing Sheets

APPARATUS, SYSTEMS, AND METHODS FOR NOTIFICATION OF REMOTE CONTROL DEVICE MODES

BRIEF SUMMARY

Apparatus, systems, and methods are disclosed for the current mode of one or more remote control devices to be displayed or played as an audio message either continuously or at various opportune times on other devices such as a presentation device (e.g., a television set). In this way, a user is able to quickly see the current mode of their remote control while watching programming on the display to determine if the remote control mode needs to be changed to control a particular device on the premises while also saving remote control battery life by dispensing with the need to indicate the current remote control mode on the remote control itself.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
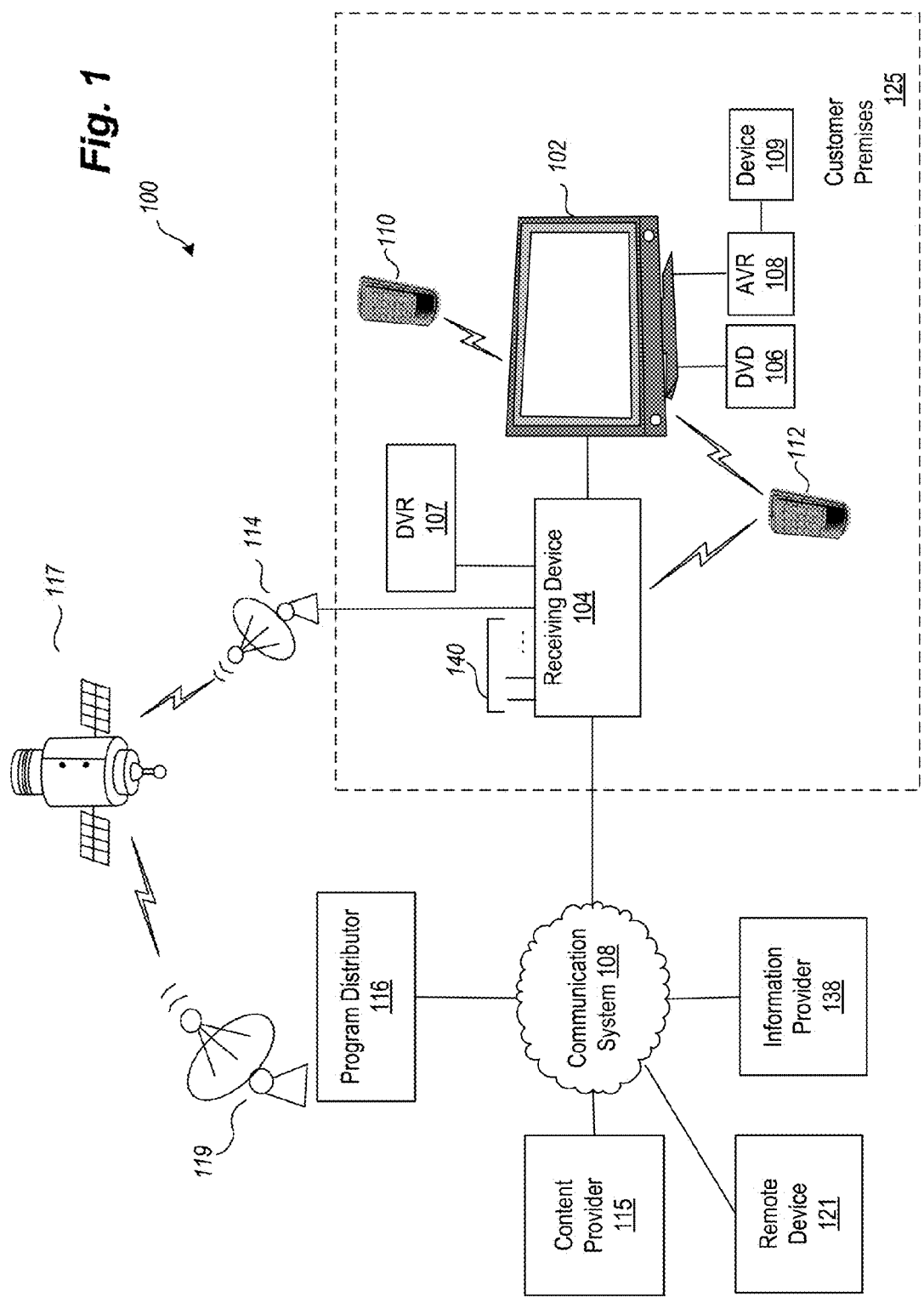
FIG. 1 overview block diagram illustrating an example content distribution environment 100 in which embodiments of a remote control device mode notification system may be implemented.

FIG. 1 is an overview block diagram illustrating an example communication environment 100 in which embodiments of a remote control device mode notification system may be implemented.

In this example embodiment, the current mode of one or more remote control devices for devices on the customer premises 125 is displayed either continuously or at various opportune times on the presentation device 102 (e.g., a television set). In this way, a user is able to quickly see the current mode of the remote control (e.g., remote control 112) while watching programming on display 102 to determine if the remote control mode needs to be changed to control a particular device on customer premises 125. This also saves battery life of the remote control 112 because it generally eliminates the need to have a remote control mode indicator light (e.g., a light emitting diode or LED) on the remote control 112 activated to indicate the current mode of the remote control device 112.

Before providing additional details regarding the operation and constitution of the remote control device mode notification system, the communication environment 100 within which the remote control device mode notification system may be implemented will be described. In the communication environment 100, audio, video, and/or data service providers, such as, but not limited to, television service providers, provide their customers a multitude of audio/video and/or data programming (hereafter, collectively and/or exclusively "programming"). Such programming is often provided by use of a receiving device 104 communicatively coupled to a display 102 configured to receive the programming.

The receiving device 104 interconnects to one or more communications media or sources (such as a cable head-end, satellite antenna, telephone company switch, Ethernet portal, off-air antenna, or the like) that provide the programming. The receiving device 104 commonly receives a plurality of programming by way of the communications media or sources described in greater detail below. Based upon selection by a user, the receiving device 104 processes and communicates the selected programming to the display 102.

For convenience, the receiving device 104 may be, but is not limited to, a "television converter," "receiver," "set-top box (STB)," "television receiving device," "television receiver," "television recording device," "satellite set-top box," "satellite receiver," "cable set-top box," "cable receiver," "media player," "digital video recorder (DVR)," "audio/visual receiver (AVR)," and/or "television tuner," etc. Accordingly, the receiving device 104 may be any suitable converter device or electronic equipment that is operable to receive programming. Further, the receiving device 104 may itself include user interface devices, such as buttons or switches. In many applications, a remote-control device or component ("remote") 112 is operable to control the receiving device 104.

The remote 112 typically communicates with the receiving device 104 using a suitable wireless medium, such as infrared ("IR"), radio frequency ("RF"), ultra high frequency (UHF) using various remote control command protocols and/or networks such as RF4CE (or ZIGBEE RF4CE) and the like and may be capable of one way and/or two-way communication. It may be a programmable and/or a "universal" remote in that the remote 112 may be configured to control many different devices on customer premises 112 by being programmed with information to control such devices (e.g., remote control codes, specific device manufacturer codes, etc.), or already be configured to control such devices.

However, for particular remote control commands that control device functions which are common to various different devices (e.g., volume), the remote 112 may need have its mode switched such that the remote control command sent is in the proper format for and only received and/or accepted by the device the user is intending to control. For example, to control the volume for the speakers on display 102, the user may select a "TV" mode button on the remote control 112. After selecting the "TV" mode on the remote control 112, the remote control is in "TV" mode and the controls on the remote 112 associated with controlling a TV will be formatted for and addressed specifically to display 102 until the mode of remote 112 is switched, for example, back to a mode for controlling the receiving device 104 or another device, such as, for example, DVD 106, digital video recorder (DVR) 107, audio/visual receiver (AVR) 108 or other device 109, etc.

Examples of a display 102 include, but are not limited to, a television ("TV"), a personal computer ("PC"), a sound system receiver, a digital video recorder ("DVR"), a compact disk ("CD") device, game system, or the like. Display 120 may employ a display screen, one or more speakers, and/or other output devices to communicate video and/or audio content to a user. In many implementations, one or more display devices 102 reside in or near a customer's premises 125 and are communicatively coupled to the receiving device 104. Further, the receiving device 104 and the display 102 may be integrated into a single device. Such a single device may have the above-described functionality of the receiving device 104 and the display 102, or may even have additional functionality.

A content provider 115 provides program content, such as television content or audio content, to a distributor, such as the program distributor 116. Example content providers include television stations which provide local or national television programming, special content providers which provide premium based programming or pay-per-view programming, or radio stations which provide audio programming.

Program content, interchangeably referred to as a program, is communicated to the program distributor 116 from the content provider 115 through suitable communication media, generally illustrated as communication system 108 for convenience. Communication system 108 may include one or more of many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, packet switched networks, and satellite systems.

In at least one embodiment, the received program content is converted by the program distributor 116 into a suitable signal (a "program signal") that is communicated (i.e., "uplinked") by antenna 119 to satellite 117 (separately illustrated herein from, although considered part of, the communication system 108). The communicated uplink signal may contain a plurality of multiplexed (e.g., time division multiplexed) programs that are organized into distinct logical or physical channels. The uplink signal is received by the satellite 117 and then communicated (i.e., "downlinked") from the satellite 117 in one or more directions, for example, onto a predefined portion of the planet. A receiver antenna 114 that is within reception range of the downlink signal communicated from satellite 117 receives the above-described downlink signal. The receiver antenna 114 can be located at customer premises 125.

Examples of customer premises 125 include a residence, a business, or any other suitable location operable to receive signals from satellite 117. The received signal is communicated, typically over a hard-wire connection, to a receiving device 104. The receiving device 104 converts the received signal from antenna 114 into a signal and/or format suitable for communication to a display 102 or another device, such as a digital video recorder (DVR) 107 or a home computing system.

The receiving device 104 may receive programming partially from, or entirely from, another source other than the above-described receiver antenna 114. Other embodiments of the receiving device 104 may receive data from program distributors 106 and/or content providers 104 via locally broadcast RF signals, cable, fiber optic, Internet media, or the like.

In addition, information provider 138 may provide various forms of content and/or services to various devices residing in the customer premises 125. For example, information provider 138 may provide a Web page (or other information) to the receiving device 104 or other computing device. Information provider 138 may further perform or facilitate electronic commerce transactions.

In one example embodiment, a typical system on customer premises 125 may include a set of interconnected entertainment devices (or simply "devices"), such as the display 102, the receiving device 104, a digital video disc (DVD) player 106, an audio/visual receiver (AVR) 108, digital video recorder (DVR) 107, and one or more other electronic devices represented by device 109. Device 109 may be another device such as the receiving device 104, display 102, DVD 106, DVR 107, AVR 108, and/or be another device such a computer, smart phone, tablet device, mobile computing device, media player, remote control, other computing or entertainment device, etc.

As shown, display 102 may be communicatively coupled to the other devices directly (e.g., receiving device 104, DVD 106, and AVR 108) or indirectly through other devices (such as DVR 107 and device 109), such as, for example, via an HDMI CEC connection, or other bus or network connection. In addition, each device may have additional input sources and/or other network connections, such as source inputs 140 of receiving device 104, described in further detail below.

One or more of the devices shown in FIG. 1 may be controllable through some type of remote control component. In the illustrated embodiment, for example, display 102 may be controlled via remote control component 110, and receiving device 104 may be controlled via remote control component 112.

In addition, one or more of the devices shown in FIG. 1 will generally be capable of interacting with display 102 to produce an on-screen display of information relating to that device or another device. For example, receiving device 104 may be configured to receive a command from remote control component 112 and subsequently instruct display 102 to display information, such as the current mode of the remote control 112, electronic program guide (EPG) information or other selectable list of content available (not shown) via receiving device 104. Similarly, display 102 may itself be configured to produce and display information relating to operation of display 102 or other devices. In one embodiment, the display 102 is configured to display the current mode of remote 112 and/or remote 110 based on information received from the receiving device 104, remote 112 or remote 110, and/or other communication channel.

Figure 2:
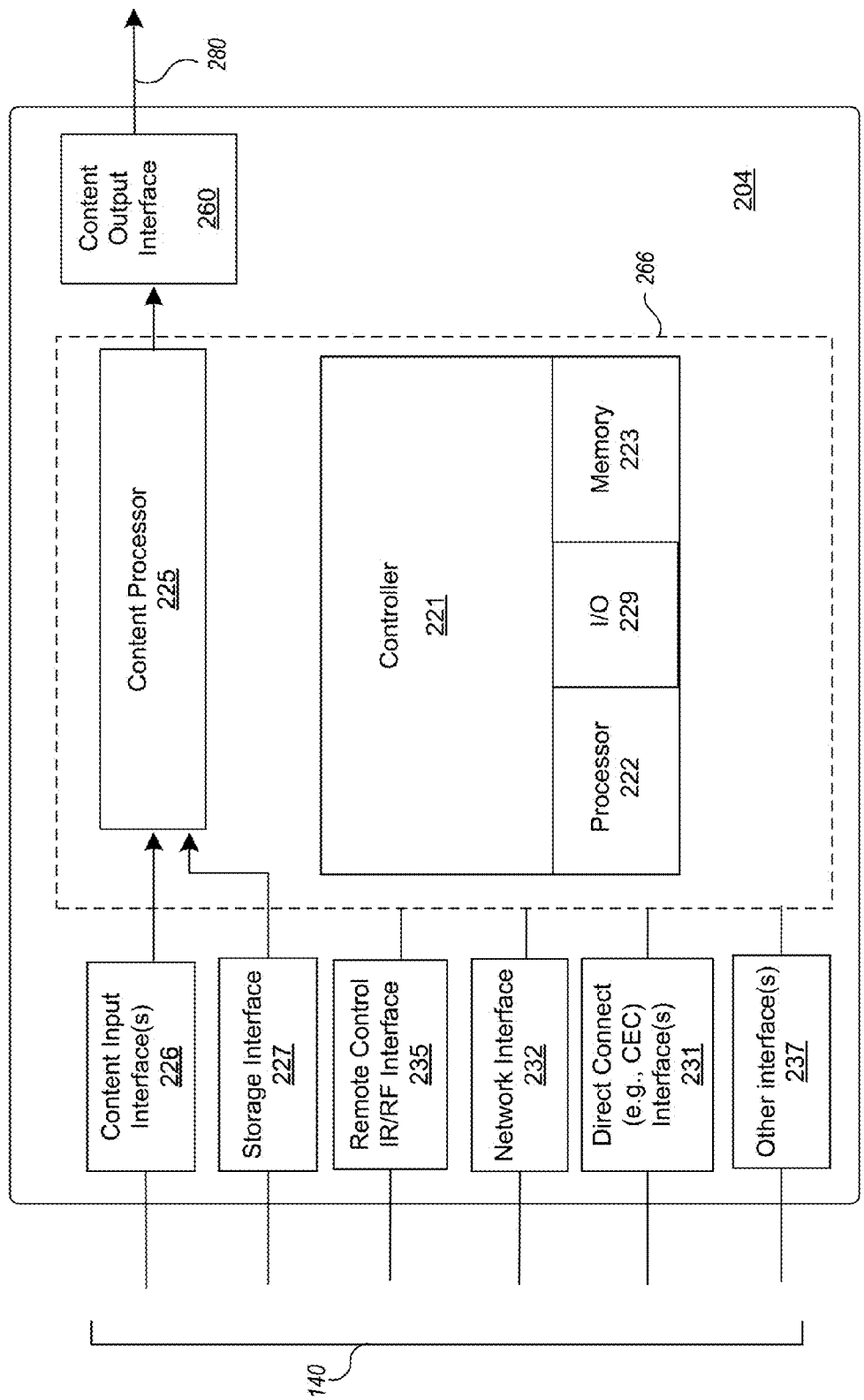
FIG. 2 is a block diagram of an example embodiment of a device used in the remote control device mode notification system in accordance with various embodiments.

Referring to FIG. 2 in conjunction with FIG. 1, shown is an example device control system 204 (which may be incorporated into any device shown in FIG. 1, such as receiving device 104) is configured to receive, decode and render and output content (e.g., render audio and/or programming for output, such as for presentation to display 102) based on any number of source inputs 140. In various embodiments, one or more source inputs 140 correspond to broadcasts received over a conventional distribution channel such as a terrestrial broadcast system, a cable television system, a direct broadcast satellite (DBS) system (e.g., from satellite 119) or the like. In other embodiments, source inputs 140 may be coupled to the Internet or another digital network, which may be part of or connected to communications system 108, using any sort of file-based, stream-based, on-demand or other distribution technique.

Device control system 204 comprises any combination of system, device and/or other components that include appropriate hardware, software, firmware and/or other processing logic to implement the various functions related to communication with other devices; receiving, processing and executing remote control commands; and receiving and presenting information (e.g., programming, menus, guides, messages, etc.) to a user. In one embodiment, device control system 204 may include a television receiver, for example, such as that in any type of set top box (receiving device) or similar system that receives programming content from a terrestrial broadcast, cable or satellite distributor (e.g., via satellite 117) for presentation on a television or other display 102. In various embodiments, control system 204 may receive and process content, programming and commands received from one or more of network, stored media, broadcast, HDMI CEC connections, any type of video and/or audio connections and/or other sources as applicable.

In the example shown in FIG. 2, device control system 204 suitably includes a controller 221 that interacts with various interfaces including, but not limited to, a content input interface 226, a storage interface 227 to a DVR (such as DVR 107), other storage device or the like; a remote control infrared and/or radio frequency (IR/RF) Interface 235; a network interface 232; one or more direct connect interface(s) 231; other interfaces 237 (e.g., to various external and/or internal devices providing data, signals, commands and/or content); and a content output interface 260 (e.g., to display 102 and/or an audio output device). Various equivalent embodiments of device control system 204 may be implemented within any additional or alternate components or products or arrangements that may differ from those shown in FIG. 2.

Controller 221 suitably includes any combination of microprocessors, microcontrollers, digital signal processors or other programmable hardware capable of directing the actions and functions of device control system 204. Controller 221 typically obtains programming content received via content input interface 226 and renders the video, audio and/or supplemental content contained within a demodulated transport stream for output at output interface 260 and presentation on an integrated output device and/or external presentation device such as display 102. To that end, controller 221 identifies and extracts relevant elementary streams within the received transport stream, inserts data as applicable, and generates an appropriate output signal 280 to present video and/or audio content on display 102. Controller 221 may further direct the storage or retrieval of programming content on DVR 107 or the like. Controller 221 also directs, interprets and processes and/or stores communications, commands and data received via Remote Control IR/RF Receiver 231, network interface 232 and CEC interface 235 as applicable. For example, Controller 221 executes remote control commands received via Remote Control IR/RF Receiver 231 and via the CEC interface 235. Some embodiments include multiple separate controllers to perform these operations and/or multiple controllers of which Controller 221 is comprised.

In various embodiments, controller 221 is based upon a "system on chip" (SoC) implementation that incorporates microcontroller hardware 222 with memory 223, input/output interfaces 229, and other features to perform the various signal processing and other actions of device control system 204. Various SoC and other integrated video processing implementations are available from Texas Instruments, Conexant Systems, NXP Semiconductor, Broadcom Inc., and many other suppliers as appropriate. Other embodiments may implement controller 221 and/or the other features of device control system 204 with any number of separate processing components, such as any number of separate chips that provide specific functions (e.g., decoding, demodulation, decryption, transcoding and/or the like), as well as any additional memories 223, input/output interfaces 229 and/or other features as desired.

Content processor module 225 includes any appropriate hardware, software and/or other logic to decode and/or transcode the received media content to a format that can be presented on interface 260. The content, including received/stored content and any other displays, guides and/or messages may then be presented to one or more interfaces 260 in any desired format. In various embodiments, display processor 225 produces an output signal encoded in any standard format (e.g., ITU656 format for standard definition television signals or any format for high definition television signals) that can be readily converted to standard and/or high definition television signals at interface 260 to produce output signal 280.

Various embodiments may allow device control system 204 to automatically or manually (e.g., in response to a viewer input) obtain additional information from a server or other system that is accessible a network (such as the Internet) coupled to network interface 232. Network interface 232 operates using any implementation of protocols or other features to support communication over a network. In one embodiment, network interface 232 supports conventional LAN, WAN or other protocols (e.g., the TCP/IP or UDP/IP suite of protocols widely used on the Internet). Network interface 232 typically includes interface hardware such as LAN adapter hardware, a conventional network interface card (NIC), a USB-based WiFi interface, or the like provided within device control system 204.

Device control system 204 may include one or more direct connect interface(s) 235, such as any physical, logical and/or other features that can be used to interface with another consumer electronics device, external computer, mobile phone, storage medium or other device as appropriate. In various embodiments, direct connect interface 231 includes an interface to a consumer electronics command (CEC) connection within the HDMI protocol. CEC is a feature of HDMI that allows, for example CEC-enabled devices to command and control each other without user intervention. Also, direct connect interface(s) 231 may include a universal serial bus (USB), IEEE 1394 ("Firewire") or other standard wired interface that allows viewers to transfer data between device control system 204 and an external device over a cable or other physical connection via a source input 140. Other embodiments may additionally or alternately implement direct interface 231 with a wireless receiver, transceiver or other module capable of wirelessly exchanging data. Examples of wireless direct connect interfaces 231 include conventional IEEE 802.15.4 ("ZIGBEE" or "ZIGBEE RF4CE") or other wireless local area network (WLAN) transceivers, including transceivers that implement other wireless signaling techniques such as IEEE 802.15.1 ("BLUETOOTH"), IEEE 802.11 ("WI-FI")

and/or the like. In various embodiments, one or more of such direct connect interface(s) 231 may also be used by remote control devices (e.g., remote control 112) to communicate with one or more devices which it controls.

Programs for viewing or other processing may be selected in any manner. In many cases, device control system 204 selects a television program, movie, media stream or other programming in response to viewer inputs received via a remote control (such as remote control component 112) or other user interface as desired. Such viewer inputs may be received at input/output interfaces 229 via the remote control IR/RF interface 235, a direct connect interface 231 and/or elsewhere in response to viewer interaction with an on-screen display window (e.g., that of an electronic program guide, menu system, etc). In various embodiments, viewers are able to use an on-screen display to select programming from content input interface 226 (e.g., terrestrial, cable, DBS or other broadcast programming), from programs previously stored in DVR 107 via storage interface 227, from streaming video received via network interface 232, from a file server or storage device directly connected via direct connect interface 231, and/or from any other source input 140.

Content output interface 260 comprises any physical and/or logical interface to a television or other display 102. Some types of device control systems 204 may incorporate a built-in display 102, such as the display in a laptop or other portable computer, a media player, smartphone, a portable television and/or the like. In other embodiments wherein device control system 204 provides video output signals 280 to an external display 102, such signals 280 may be provided in any compatible format. In embodiments wherein display 102 is a conventional television, for example, display interface 260 may provide video and audio output signals in any conventional format, such as component video, S-video, HDMI, Digital Visual Interface (DVI), IEEE 1394, and/or any other formats as desired. In a particular embodiment, signals 280 are transferred in accordance with an HDMI interface.

HDMI is an audio/video interface for transmitting uncompressed digital data, and implements certain EIA/CEA-861 standards that define video formats and waveforms, transport of LPCM audio, and auxiliary data. In general, HDMI supports, on a single cable, uncompressed video, up to 8 channels of compressed or uncompressed digital audio, a consumer electronics control (CEC) connection, and an Ethernet data connection. As used herein, the term "HDMI" refers to past HDMI versions (HDMI 1.0-1.4) and future versions as may be appropriate to implement embodiments of the present disclosure. HDMI versions 1.0-1.4 are hereby incorporated by reference.

In accordance with one embodiment, display 102 displays a message indicating the current mode of remote control 112. For example, when remote control goes into a "TV" mode, information indicating that it is in such a mode is communicated to receiving device 104. Receiving device 104 then receives and processes this information using controller 221 and communicates this information to content processor 225 which includes the message regarding the mode of remote control 112 in the content to be displayed on display 102. In other embodiments, this information indicating which mode remote 112 is in is communicated from remote 112 directly to display 102 and/or other devices on customer premises 125 and may also be communicated over the consumer electronics control (CEC) connection or other communication channel between the devices.

Figure 3A:
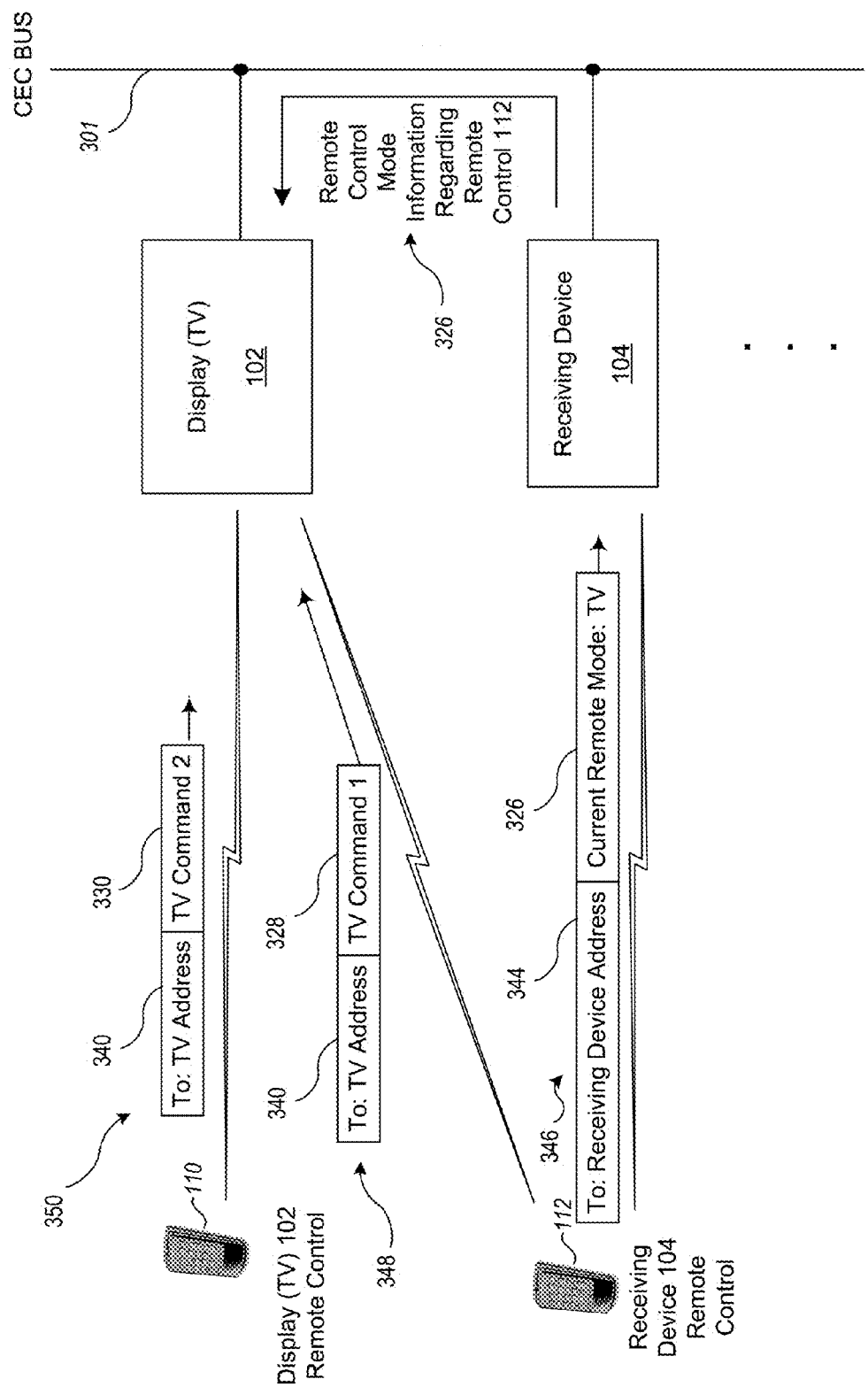
FIG. 3A is a block diagram of devices connected to a consumer electronics control (CEC) bus in accordance with one embodiment in which remote control current mode information is sent from the remote control device separately from remote control commands.

FIG. 3A is a block diagram of devices connected to a consumer electronics control (CEC) bus 301 in accordance with one embodiment in which current mode information of remote 112 and/or remote 110 is sent from the respective remote 112 and/or remote 110 separately from the remote control commands of the respective remote controls.

In general, communication over CEC bus 301 is performed between an initiator and one or more followers. Initiator-asserted bits provide data, while follower-initiated bits provide acknowledgement. CEC messages are sent over CEC bus 301 using frames, where each frame consists of a start bit followed by header block and optional data blocks.

CEC assumes that all entertainment devices in a system are directly or indirectly connected to a root display in a tree, where sources are considered "leaf" nodes. Accordingly, display 102 and receiving device 104 in FIG. 3A each have a corresponding physical address and logical address. During initialization, or "hot-plug", display 102 and receiving device 104 each obtain a physical address via the CEC protocol, which consists of four numbers indicating that device's place in the hierarchy relative to a "root" address of 0.0.0.0. For example, if display 102 is considered the "root", and receiving device 104 is attached to an input number 1 of display 102, then receiving device 104 will have a physical address of 1.0.0.0.

Display 102 and receiving device 104 will also obtain a logical address reflecting its product type by negotiating with each other via CEC bus 301. Further information regarding logical addresses can be found, for example, in the HDMI specification, and need not be described in detail herein. These addresses may be the same or different than the addresses used by remote control device 112 and remote control device 110 to send remote control commands to specific devices. In some embodiments, there may be no CEC Bus 301 or any other such communication bus or network between the devices.

Consider an example scenario in which a user would like to control the volume of the speakers on the display (e.g., a TV) using receiving device remote control 112 instead of the TV remote control 110. To do so, the user may put remote 112 in "TV" mode, such as by pressing a "TV" mode button on remote 112 or the like. Receiving device remote control 112 then switches into "TV" mode to control display 102. Remote 112 then sends remote control mode information 326 to receiving device 104 in remote control message 346 indicating that the current mode of remote 112 is "TV". This is sent to the receiving device 104, for example, by including an address 344 of the receiving device 104 as the destination address in the remote control message 346 containing the current remote control mode information 326. In one embodiment as shown in FIG. 3A, the remote control message 346 containing the current remote control mode information 326 is separate from remote control commands of remote 112 such as remote control command 348 containing the address 340 of the display 102 (e.g., TV) and the associated volume adjustment command 328 for the TV. Additionally, remote 110 of display 102 may also continue to send separate commands to display 102 such as in example remote control command message 350 containing the address 340 of the display 102 (e.g., TV) and the different associated command 330 for the TV.

The remote control mode information 326 may also or instead be sent immediately or very soon after the remote control command message 348 including the command 328 to adjust the volume of the display 102 is sent to display 102 from remote 112 while remote 112 is in "TV" mode. Thus, the sending of the remote control mode information 326 may be triggered by any number of events, including, but not limited to, one or more of: remote control 112 switching to particular mode, a corresponding mode button being pressed on remote control 112, a remote control command being sent while remote control 112 is in a particular mode, movement of the remote control 112 (e.g., as detected by a motion sensor of remote control 112), etc.

Receiving device 104 will then send audio and/or video to display 102 comprising a message to play and/or display on display 102 indicating remote 112 is currently in "TV" mode. In other embodiments, the raw remote control mode information 326 may also or instead be communicated over CEC Bus 301 (or other device communication channel) to display 102 and then, taking this information, display 102 may generate or otherwise produce a message to be presented indicating which mode remote 112 is in. In yet other example embodiments, remote 112 may also or instead send the remote control mode information 326 directly to display 102 or to another device which routes such information to other devices.

For example, remote control 112 may send multiple messages or a broadcast message to all devices on CEC bus 301 via receiving device 104 or other device on CEC bus 301 indicating which mode remote control 112 is in, and/or send multiple messages directly to all the devices for which it is configured to control or of which remote control 112 otherwise knows the addresses. In this way, any device which knows what mode remote 112 is in may in turn send information to a display coupled to that device to present or produce an audio and/or video message indicating which mode remote control 112 is in. However, if multiple devices on the premises 125 each has a remote control that generates and sends such remote control mode information for that particular remote (e.g., remote control 110), a remote control identifier (e.g., an address of the respective remote control) may be sent from the particular remote control when sending messages and/or commands. This identifier may be used by the device receiving such information to indicate in the message presented to the user which remote control is in which mode. For example, such an embodiment is shown in more detail in FIG. 3B and FIG. 3C.

Display 102 then displays the message indicating which mode remote control 112 is in such that the message can be seen and/or heard by the user when viewing display 102. This message may also be presented on top of or otherwise included as part of whatever programming or other content is being presented or is to be sent for presentation on display 102. In other embodiments, the message may instead or also be presented on a display (e.g., front panel display) of the receiving device 104 or other device and/or played via speakers of the receiving device 104 or other device.

In some embodiments, the device to which the remote control mode information 326 (or message indicating which mode the remote control is in) is sent may be a user's mobile device such as a smart phone, tablet device, notebook computer and/or a remote device (e.g., remote device 121 shown in FIG. 1). This information may be communicated via any wireless communication channel over which the remote control 112 and the other device are capable of directly or indirectly communicating. For example, these communication channels include, but are not limited to, one or more of: IR, RF, Bluetooth®, local area network (LAN), ZIGBEE, Wi-Fi, WLAN, the Internet, and/or other communication channels of communication system 108.

The process described above may be repeated each time remote control 112 enters a new mode, each time the remote control is moved (as detected by a motion sensor in the remote control 112), and/or each time a command is sent via remote control 112. For example, when the user presses a "DVD" mode button on remote control 112, remote control 112 leaves the previous "TV" mode and remote control 112 sends a corresponding remote control mode information message to receiving device 104 and/or other devices indicating remote control 112 is now in "DVD" mode. This information is then presented to the user, for example, on display 102 coupled to receiving device 104.

Figure 3B:
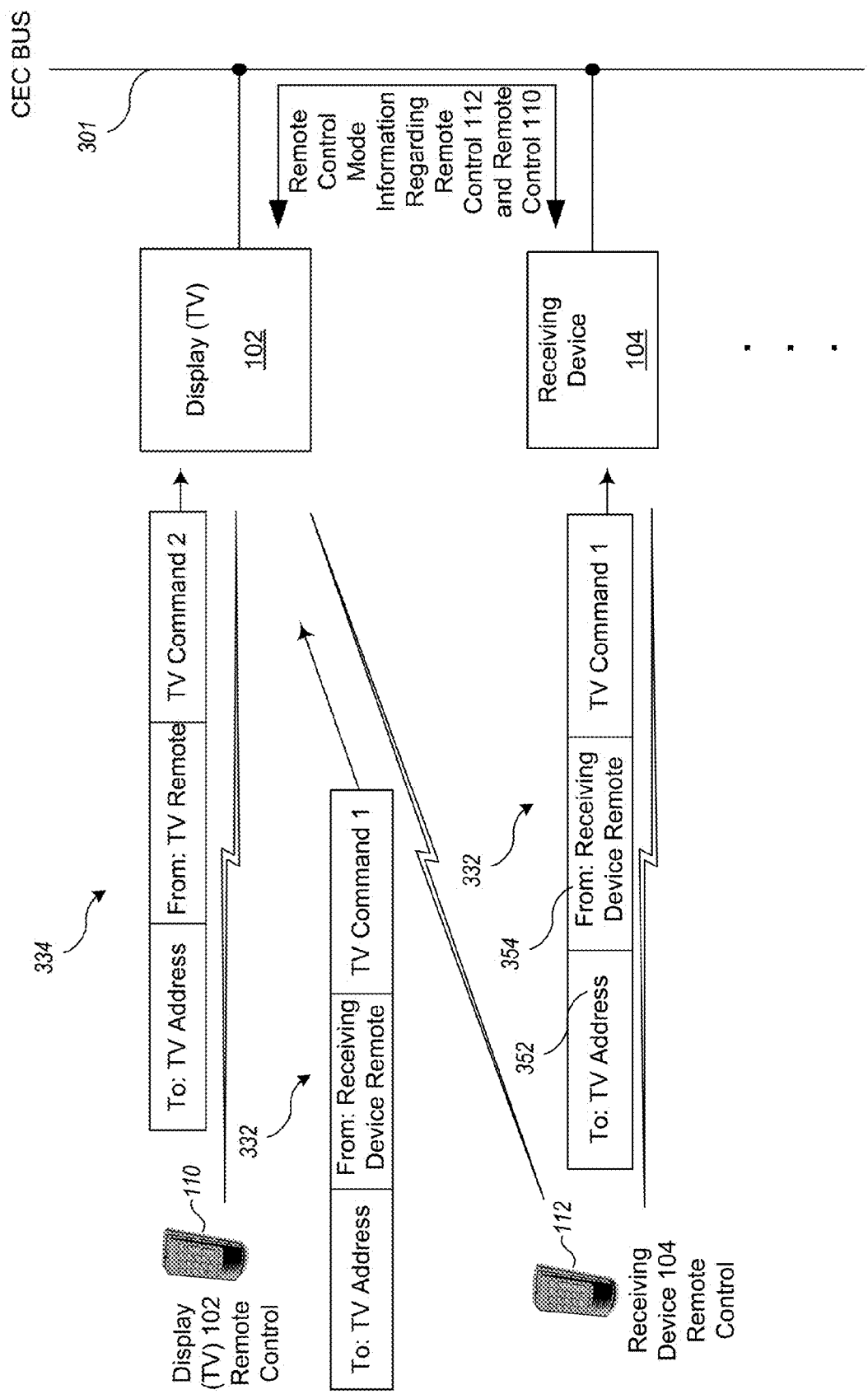
FIG. 3B is a block diagram of devices connected to a consumer electronics control (CEC) bus in accordance with one embodiment in which current remote control mode information is tracked for multiple different remote controls and the current mode for each is determined from the device destination address sent from the remote control device as part of the remote control command.

FIG. 3B is a block diagram of devices connected to the consumer electronics control (CEC) bus 301 in accordance with one embodiment in which current remote control mode information is tracked for multiple different remote controls and the current mode for each is determined from the device destination address sent from the remote control device as part of the remote control command.

For example, in one embodiment, there is no separate remote control mode message such as remote control mode message 346 as shown in FIG. 3A sent by remote control 112 in order to have the current remote control mode communicated to another device such as receiving device 104 or display device 102. Instead, the current mode of the remote control 112 is determined by the device receiving the command based on the address of the device contained in the remote control command. In this embodiment, the address of the device to which the remote control command is sent corresponds to which mode the remote control 112 is in.

In particular, when remote control 112 switches to "TV" mode, the remote control command messages sent by remote control 112 associated with controlling a TV (e.g., volume, channel change, input select) include the address 352 of display (TV) 102. Thus, the mode can be determined by a device receiving the command (e.g., receiving device 104) that is configured to correlate the address of the remote control command message to a device mode. The data containing such correlations or associations can be programmed into a device such as receiving device 104 by a user, manufacturer, content service provider or other provider of the device.

Instead or additionally, such information may be communicated to other devices over a communication channel, such as CEC bus 301, from individual devices as they are discovered by or make themselves known to other devices on the communication channel. For example, when display 102 appears on CEC bus 301, it may automatically communicate to other devices on bus 301 (including receiving device 104) the address of that device used for remote control commands to that device (CEC address, remote control command code, device manufacturer code, etc.). The receiving device 104 then listens for remote control commands having the address of display 102 in addition to remote control commands having the address of receiving device 104. Similarly, any device on the CEC bus 301 may receive a command from a remote control device determine what mode it is in by using the address of the device to which the command is sent indicated in the remote control command message, and then use this information to display the current mode of the remote control and/or send this information to another device on bus 301 to present the message. To differentiate remote control commands originating from different remote controls, devices on bus 301 receiving such commands may use information contained in the remote control command message identifying the remote control from which the command originated. In this way, the device receiving the command will know which particular remote control device sent the command and accordingly cause such information identifying the particular remote control to be displayed along with the current mode that particular remote control is in.

For example, when receiving device 104 receives remote control commands with the address of display 102 (e.g., remote control command 332), it determines that receiving device remote control 112 is in "TV" mode. To differentiate remote control commands originating from receiving device remote control 112 and another remote control (e.g., remote control 110 of display 102), receiving device 104 may use information contained in the remote control command 332 identifying the remote control from which the command originated. For example, this information may be some identifier 354 (e.g., address or other identifier) of receiving device remote control 112 received in remote control command 332 as shown in FIG. 3B. For example, such information is often able to be sent using various remote control command protocols of various remote controls capable of two-way communication with the device it controls or other devices. Using such two-way communication between the remote control 112 and receiving device 104, the receiving device 104 may also send an acknowledgement message back to remote control 112. The receiving device 104 may then communicate information to display 102 causing display 102 to present a message 338 to the user indicating that the receiving device remote control 112 in particular is in the "TV" mode as shown in FIG. 3C, for example.

Figure 3C:
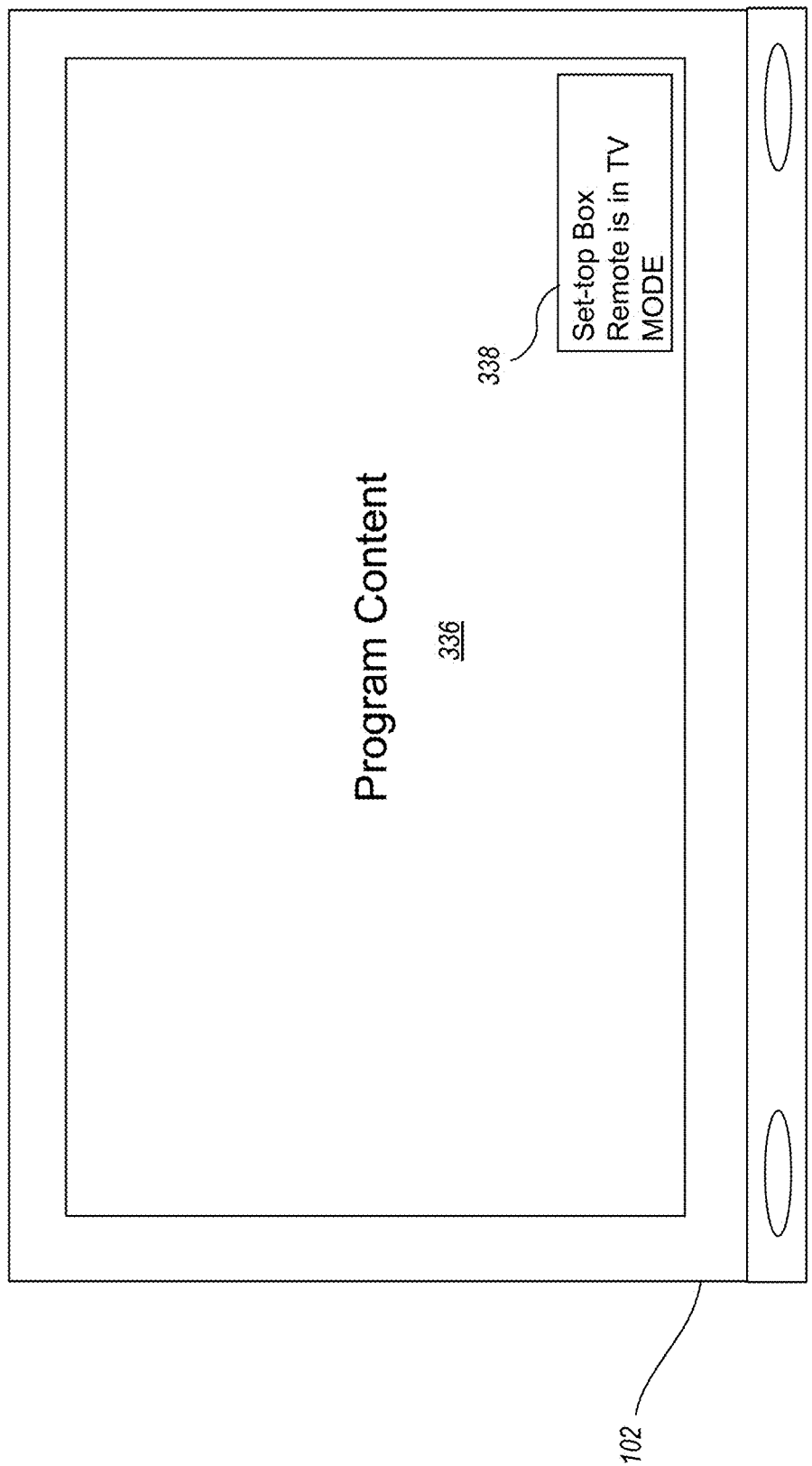
FIG. 3C is a diagram of a front view of a presentation device on which a current mode of a remote control device is being displayed according to one embodiment.

FIG. 3C is a diagram of a front view of a display device 102 on which a current mode of remote control device 112 is being displayed according to one embodiment. In the present example, the current mode of remote control device 112 is displayed as a message 338 in the lower corner on the screen 336 of display 102 such that the viewer can continue viewing the current program on display 336 providing less distraction from the current programming. There may instead or also be an audio message, signal or alert presented indicating the current mode of the remote control. Also, the message 338 indicates which remote control (e.g., "Set-top Box Remote" in the present example) is in the displayed mode. In other embodiments, the message 338 does not contain such information and may just indicate the current mode, or may include additional information regarding the status of the system.

The message 338 may be displayed anywhere on the screen 336 and at any time for any duration. For example, the message 338 may be displayed continuously (i.e., "always on") and change each time the remote control mode changes or may be presented for a limited time and not presented again until the remote control is picked up by a user, a control is activated (e.g., a physical or virtual button is pressed) on the remote control 112, the remote control mode changes, and/or designated time interval. There may also be a button or other control designated on the remote control 112 to tell the display, receiving device or other device to present the message 338 and/or cancel or remove the message 338.

In some embodiments, the message may be presented as a view banner in the corner or along the bottom of the screen 336, or as a watermark across a portion of the screen 336. The location, timing and duration of the message 338 may also be selectable and/or configurable by the manufacturer, content service provider and/or end user of the remote control 112 and/or corresponding device (e.g., receiving device 104). In some embodiments, the message 338 may also or instead be displayed on a user interface, screen, front panel and/or integrated display of the receiving device 104 or other device than remote control 112 in the form of text, LED lighting patterns or colors, etc.

Figure 4:
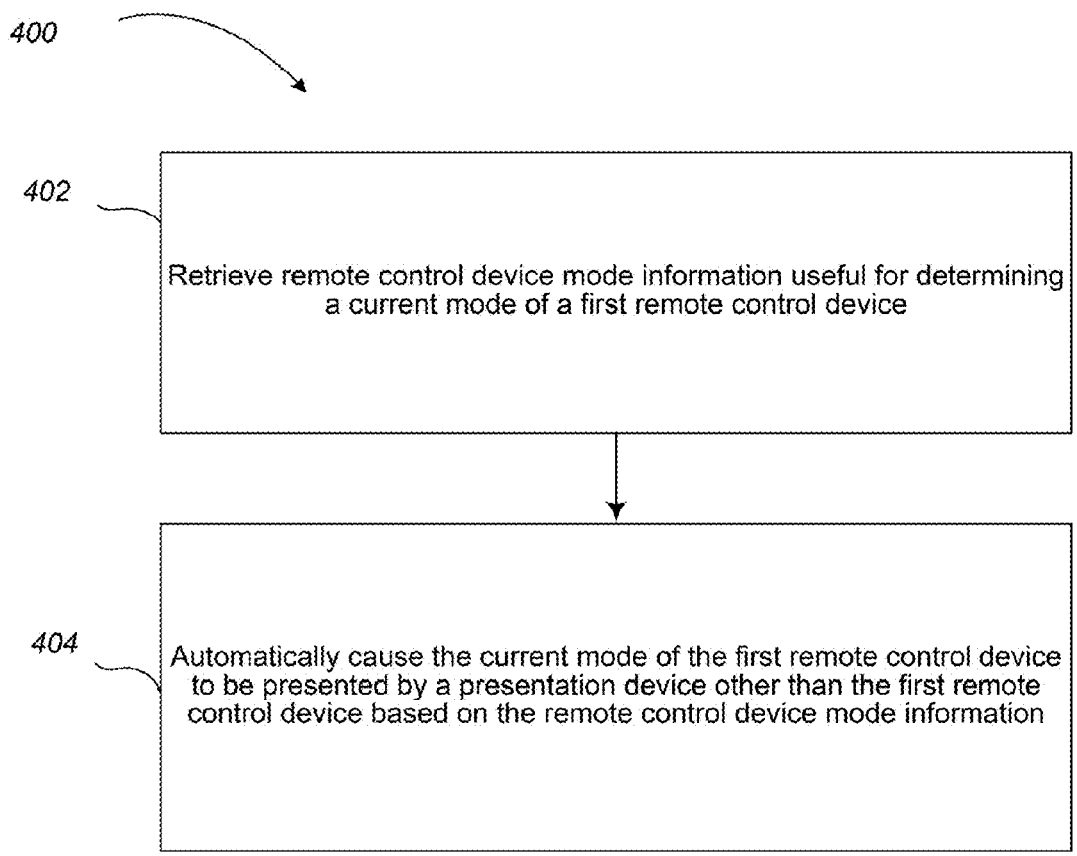
FIG. 4 is a flowchart illustrating a process for presenting a current mode of a remote control device in accordance with one embodiment.

FIG. 4 is a flowchart illustrating a process 400 for presenting a current mode of a remote control device in accordance with one embodiment.

At 402, a device in the system for notification of remote control device modes retrieves remote control device mode information useful for determining a current mode of a first remote control device.

At 404, the device in the system for notification of remote control device modes automatically causes the current mode of the first remote control device to be presented by a presentation device other than the first remote control device based on the remote control device mode information.

Figure 5:
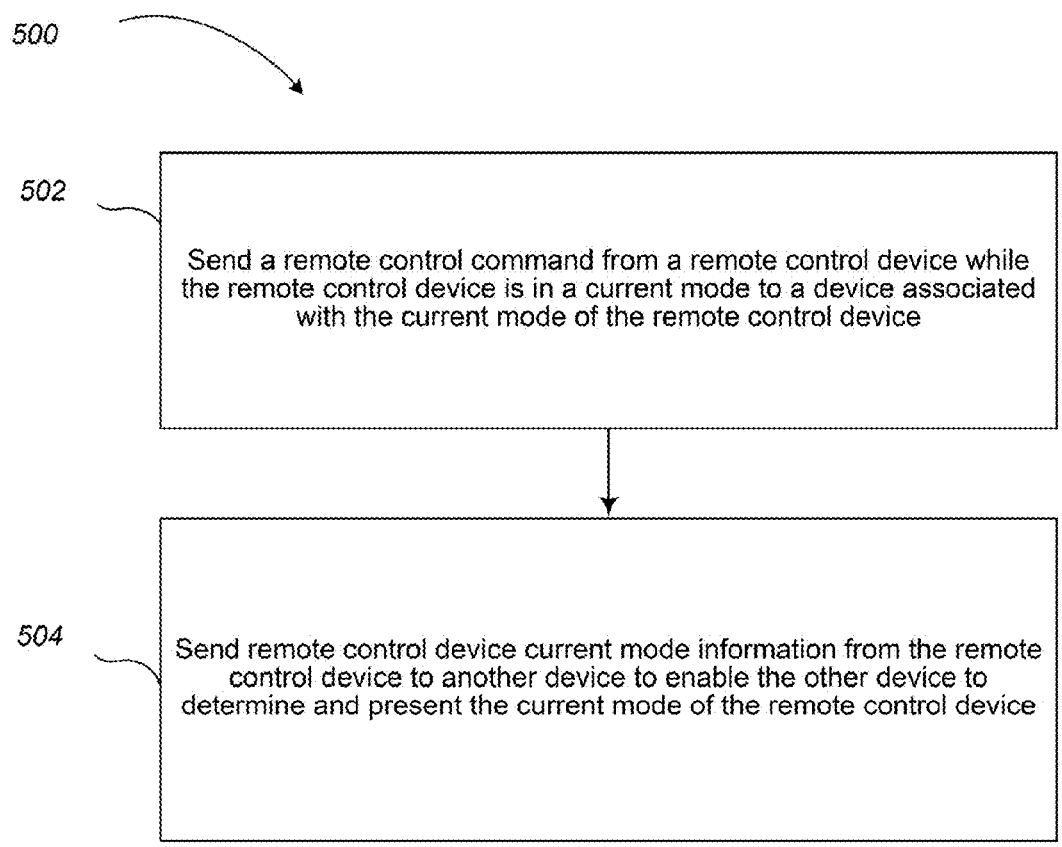
FIG. 5 is a flowchart illustrating a process from the perspective of a remote control for presenting a current mode of the remote control device in accordance with one embodiment.

FIG. 5 is a flowchart illustrating a process 500 from the perspective of a remote control for presenting a current mode of the remote control device in accordance with one embodiment.

At 502, a remote control device sends a remote control command while the remote control device is in a current mode to a device associated with the current mode of the remote control device.

At 504, the remote control device sends remote control device current mode information from the remote control device to another device to enable the other device to determine and present the current mode of the remote control device.

Figure 6:
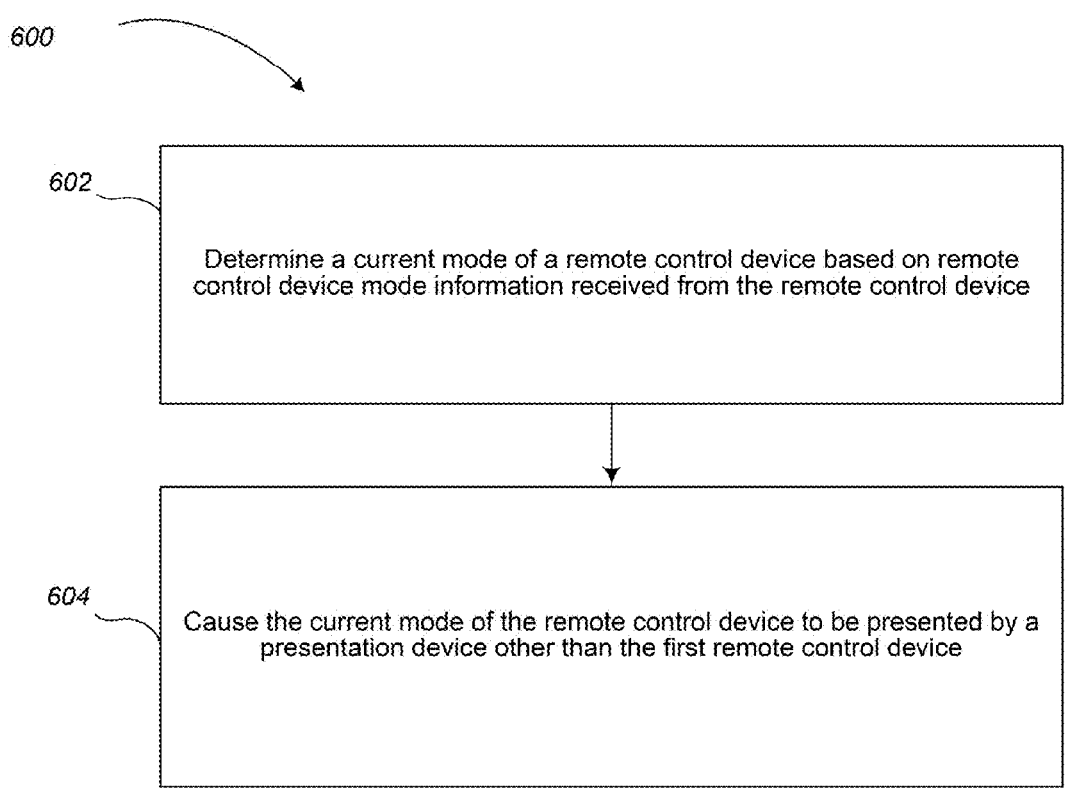
FIG. 6 is a flowchart illustrating a process for presenting a current mode of a remote control device in accordance with another alternative embodiment.

FIG. 6 is a flowchart illustrating a process 600 for presenting a current mode of a remote control device in accordance with another alternative embodiment.

At 602, a device in the system for notification of remote control device modes determines a current mode of a remote control device based on remote control device mode information received from the remote control device.

At 604, the device in the system for notification of remote control device modes causes the current mode of the remote control device to be presented by a presentation device other than the first remote control device.

The various functions, methods, and other features described herein may be performed by any hardware, software and/or firmware logic stored in any non-transitory tangible storage medium within device control system 204, including any sort of optical, magnetic or other storage hardware. In some embodiments, its various functions are implemented using software or firmware logic that is stored within a flash memory or ROM (e.g, memory 223) and executed by controller 221 executing on SoC 266, processor 222 and/or other processing hardware within device control system 204. Other embodiments, however, will execute one or more functions on other processing servers, circuits or other logic located external to device control system 204.

While several exemplary embodiments have been presented in the foregoing detailed description, it should be appreciated that a vast number of alternate but equivalent variations exist, and the examples presented herein are not intended to limit the scope, applicability, or configuration of any embodiment in any way. To the contrary, various changes may be made in the function and arrangement of elements described without departing from the scope of the claims and their legal equivalents.

The term "exemplary" or "example" is used herein to represent one example, instance or illustration that may have any number of alternates. Any implementation described herein as exemplary is not necessarily to be construed as preferred or advantageous over other implementations.

The invention claimed is:
1. A method in a remote control device mode notification system, comprising:

retrieving, by the remote control device mode notification system, remote control device mode information useful for determining a current mode of a first remote control device; and automatically causing, by the remote control device mode notification system, the current mode of the first remote control device to be presented by a presentation device other than the first remote control device based on the remote control device mode information;

receiving, by the remote control device mode notification system, an indication to present the current mode of the first remote control device or receiving the remote control device mode information useful for determining a current mode of first remote control device; and in response to the receiving, performing, by the remote control device mode notification system, the retrieving of the remote control device mode information and the automatically causing of the current mode of the first remote control device to be presented on the presentation device other than the first remote control device;

wherein the receiving includes receiving the indication or the remote control device mode information over a consumer electronics communication bus from a device to which the first remote control device sent a command while in the current mode.

2. A method in a remote control device mode notification system, comprising:

retrieving, by the remote control device mode notification system, remote control device mode information useful for determining a current mode of a first remote control device; and automatically causing, by the remote control device mode notification system, the current mode of the first remote control device to be presented by a presentation device other than the first remote control device based on the remote control device mode information;

wherein the automatically causing the current mode of the first remote control device to be presented by a presentation device other than the first remote control device is triggered by a user picking up the first remote control device.

* * * * *